No. 756,482. PATENTED APR. 5, 1904.
W. DURST.
CURTAIN RING.
APPLICATION FILED FEB. 19, 1904.

NO MODEL.

WITNESSES:
Julius H. Lutz
John Lotka

INVENTOR
William Durst
BY
Briesen & Knauth
ATTORNEYS

THE NORRIS PETERS CO., PHOTO-LITHO., WASHINGTON, D. C.

No. 756,482. Patented April 5, 1904.

UNITED STATES PATENT OFFICE.

WILLIAM DURST, OF BROOKLYN, NEW YORK.

CURTAIN-RING.

SPECIFICATION forming part of Letters Patent No. 756,482, dated April 5, 1904.

Application filed February 19, 1904. Serial No. 194,314. (No model.)

*To all whom it may concern:*

Be it known that I, WILLIAM DURST, a citizen of the United States, and a resident of the borough of Brooklyn, county of Kings, city and State of New York, have invented certain new and useful Improvements in Curtain-Rings, of which the following is a specification.

My invention relates to curtain-rings, and has for its object to provide a simple and strong ring of this class which may be manufactured without soldering or brazing, and therefore at little expense.

The invention will be fully described hereinafter, and the features of novelty pointed out in the appended claims.

Reference is to be had to the accompanying drawings, in which—

Figure 1:
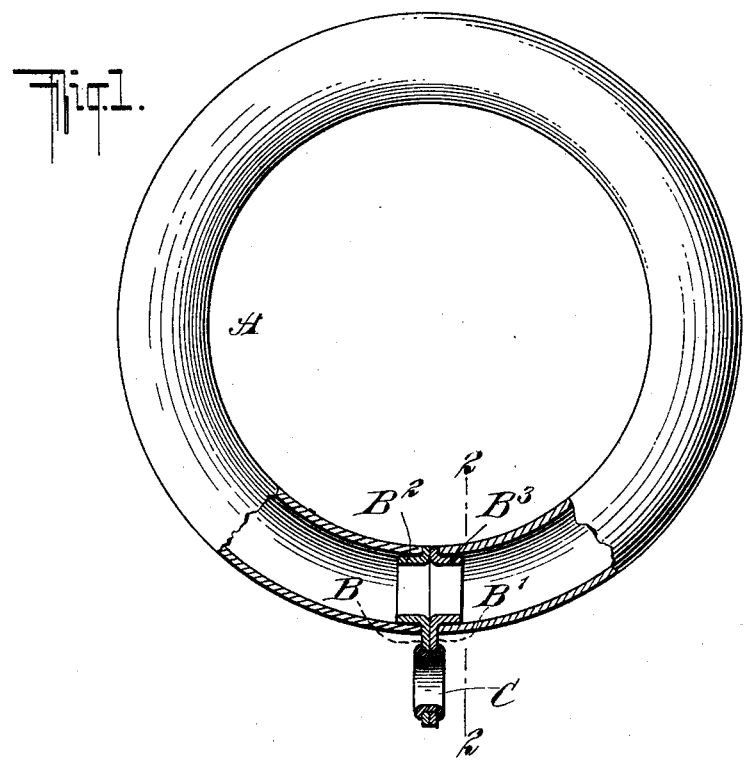
Figure 2:
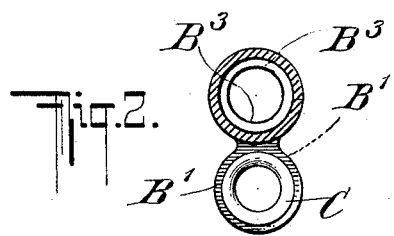

Figure 1 is an elevation of one form of my improved curtain-ring with parts in section. Fig. 2 is a cross-section on line 2 2 of Fig. 1, and Fig. 3 is a partial sectional view showing another form of my invention.

The curtain-ring comprises a tubular body A, bent into annular shape, and my invention has especial reference to the connection of the ends of such ring. According to Figs. 1 and 2, two plates or strips B B' are inserted between the ends of the ring proper and provided with projections $B^2$ $B^3$ within the tube A in engagement with the walls thereof. These projections are preferably struck up from the strips themselves and may be made annular or continuous to engage the tube on its entire periphery. The outer portions of the strips B B' are perforated to receive the eyelet C, which forms a means of connecting the said strips and at the same time serves for the support of the curtain in any approved manner. It will be seen that no soldering or brazing is required, yet the tube A is firmly connected with the strips B B'. The strips may be inserted in position before the tube A is fully bent to annular shape.

Figure 3:
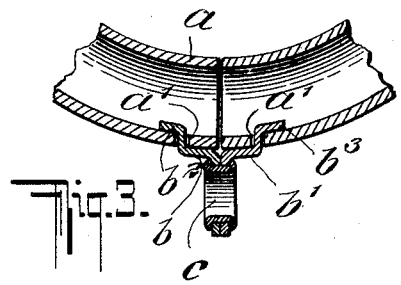

As shown in Fig. 3, the tube $a$ is provided in its outer surface at a distance from its ends with openings $a'$, adapted to receive hooks or projections $b^2$ $b^3$, which extend from strips or plates $b$ $b'$, connected at their outer portions by means of an eyelet $c$ in a manner similar to that first described. It will be seen that the inner portions of the hooks or projections $b^2$ $b^3$ lie along the inner wall of the tube $a$, while the outer portions of said hooks are in contact with the outer surface of the tube. In this construction also the strips $b$ $b'$ are firmly connected with the tube $a$ without any soldering or brazing. Since the strain which comes on the strips connected by the eyelet is downward, such strain will have no tendency to open the ring proper, and thus even the structure shown in Figs. 1 and 2 will be perfectly reliable for practical purposes. In the form of construction shown by Fig. 3 the hooks or projections $b^2$ $b^3$ oppose a springing apart of the ends of the tube $a$.

What I claim as new, and desire to secure by Letters Patent, is—

1. A curtain-ring comprising an annular tube, strips or plates located at the junction of the ends of said tube and provided with projections extending within said tube, and a connecting member which holds together the outer portions of said strips.

2. A curtain-ring comprising an annular tube, strips located at the junction of the ends of said tube and provided with projections extending in opposite directions within said tube, and a connecting member secured to the outer portions of said strips.

3. A curtain-ring comprising an annular tube, strips located at the junction of the ends of said tube and provided with projections located within the tube, and an eyelet connecting the outer portions of said strips.

4. A curtain-ring comprising an annular tube, strips located at the junction of the ends of said tube and provided with projections extending within the tube along the inner surface thereof, and a member connecting the outer portions of said strips.

5. A curtain-ring comprising an annular tube, strips located at the junction of the ends of said tube and provided with projections located within the tube and extending in opposite directions along the inner surface thereof, and an eyelet connecting the outer portions of said strips.

In testimony whereof I have signed my name to this specification in the presence of two subscribing witnesses.

WILLIAM DURST.

Witnesses:
 JOHN LOTKA,
 JOHN A. KEHLENBECK.